United States Patent
Müller et al.

(10) Patent No.: US 7,467,110 B2
(45) Date of Patent: Dec. 16, 2008

(54) METHOD FOR MARKET MAKING

(75) Inventors: Ulrich A. Müller, Zurich (CH); Richard B. Olsen, Zurich (CH)

(73) Assignee: The Olsen Group (CH)

( * ) Notice: Subject to any disclaimer, the term of this patent is extended or adjusted under 35 U.S.C. 154(b) by 1730 days.

(21) Appl. No.: 09/764,366

(22) Filed: Jan. 18, 2001

(65) Prior Publication Data

US 2002/0010673 A1 Jan. 24, 2002

(51) Int. Cl.
 *G06Q 40/00* (2006.01)
(52) U.S. Cl. .......................................... 705/37; 705/35
(58) Field of Classification Search .................. 705/35, 705/37
See application file for complete search history.

(56) References Cited

U.S. PATENT DOCUMENTS

| | | | | |
|---|---|---|---|---|
| 5,911,136 A | * | 6/1999 | Atkins | 705/37 |
| 6,016,483 A | * | 1/2000 | Rickard et al. | 705/37 |
| 6,195,647 B1 | * | 2/2001 | Martyn et al. | 705/36 R |
| 7,177,833 B1 | * | 2/2007 | Marynowski et al. | 705/38 |
| 7,251,629 B1 | * | 7/2007 | Marynowski et al. | 705/37 |
| 2002/0019795 A1 | * | 2/2002 | Madoff et al. | 705/37 |
| 2007/0208659 A1 | * | 9/2007 | Gershon | 705/37 |

* cited by examiner

*Primary Examiner*—Jagdish N Patel
(74) *Attorney, Agent, or Firm*—Morgan, Lewis & Bockius LLP (57) ABSTRACT

A preferred embodiment of the subject invention automates the market making process for currency trading. When a quote request for a currency is received from a client (preferably over a computer network such as the Internet), software of a preferred embodiment calculates a real-time bid and ask price for the currency. The subject invention is applicable to any asset for which market making is appropriate, and is not restricted to currency exchange.

36 Claims, 8 Drawing Sheets

METHOD FOR MARKET MAKING

FIELD OF THE INVENTION

The subject invention is directed to asset trading over a computer network, and more particularly to automated market making.

BACKGROUND

A market maker for an asset (security, currency, option, etc.) is traditionally a person or firm who will quote both a bid and an ask price on the asset whenever asked to do so. The bid is the price at which the market maker is prepared to buy and the ask is the price at which the market maker is prepared to sell. Typically, at the time the bid and ask are quoted, the market maker does not know whether the trader who asked for the quotes wants to buy or sell the asset. The ask is higher than the bid, and the amount by which the ask exceeds the bid is referred to as the bid-ask spread. The existence of the market maker ensures that buy and sell orders can always be executed at some price without delay. Thus, market makers add liquidity to the market in which they participate.

Market makers make their profits from the bid-ask spread. Thus, the spread must be large enough to cover a market maker's risks, but small enough to compete with spreads offered by other market makers. To reduce their exposure to losses, market makers utilize a variety of risk-reducing strategies, collectively referred to herein as hedging. The more accurately risk can be assessed, the smaller a market-maker can make the spread. A market maker's risk on a particular quote is largely a function of the size of the order for which the quote has been requested and the market maker's current position (exposure) in the market.

SUMMARY

A preferred embodiment of the subject invention comprises a market making process for currency trading. When a quote request for a currency is received from a client (preferably over a computer network such as the Internet), software of a preferred embodiment calculates a real-time bid price and a real-time ask price for the currency. The subject invention is applicable to any asset for which market making is appropriate, and is not restricted to currency exchange.

DETAILED DESCRIPTION OF PREFERRED EMBODIMENTS

1 Introduction

Market making is a fast moving business, where small spreads are earned in very short periods of time. The potentially high returns generated from market making are earned by taking the risk of not being able to control the short term inventory price.

A preferred embodiment of the subject invention comprises a method for market making. The preferred embodiment of the invention calculates bid and ask quotes based on a hedging method.

A detailed description is provided herein of a hedging method used to control risk in a currency trading system. A preferred embodiment uses known trading models to control exposure risk from market making: the trading model positions provide a target position for hedging the exposure risk. In the market making process, the actual position is allowed to oscillate, deviating by a certain percentage from this target position. By restricting how far the actual position may deviate from the target position, the risk of market making is prevented from exceeding the (weighted average) risk of the trading models themselves.

Hedging the market making risk with the help of these models allows a system operator (preferably, the method is performed by a computer system) to provide significantly lower bid/ask spreads to Internet clients. The size of the spread will depend on the performance of the hedging method, the quality of the market data available, processing costs for individual trades, and other factors, but the goal is to attain spreads equal to or lower than those used in the interbank market, which corresponds to about 5 to 10 basis points for the major currencies.

The primary role of the hedging method ("hedging tool") is to provide a currency trading system operator with bid and ask quotes in real time to allow transactions at any moment. These quotes will be a function of the trading size desired by the client and of the current position of the trading system.

2 Overview

A preferred embodiment of the subject invention uses trading models for the major FX rates (comprising USD, EUR, JPY, GBP, and CHF). For other currencies, the data quality will be the major obstacle for a real-time system. The hedging tool preferably is based on known trading models (discussed below, in Section 2.2) that define a general target position of a currency trading system (CTS) portfolio. A certain percentage of the full exposure of the trading models is taken by the hedging tool to quote the prices. Assuming that there is no correlation between the overall positions of the clients and the trading model positions, the risk incurred by a preferred CTS does not exceed that of the trading model portfolio.

2.1 Hedging Tool

The inputs to a preferred hedging tool are the current open position of the CTS (as an aggregate of the positions of the individual clients), the position of the trading models, and the market price for the different foreign exchange (FX) rates quoted on the interbank market. The FX rates preferably come from a Reuters-type feed directly, or after being filtered. The positions of the preferred trading models and the current CTS net balance are provided by a portfolio tracking tool.

The output of the hedging tool is a series of bid/ask prices that depend on the size of the respective requested volume of transaction. The bid/ask price calculation is based on parameters that can be adjusted in order to keep the general position of the CTS as close as possible to the trading model position.

The parameters are subject to testing, optimization, and experiment. Section 4 provides a more detailed discussion of this issue.

Figure 7:
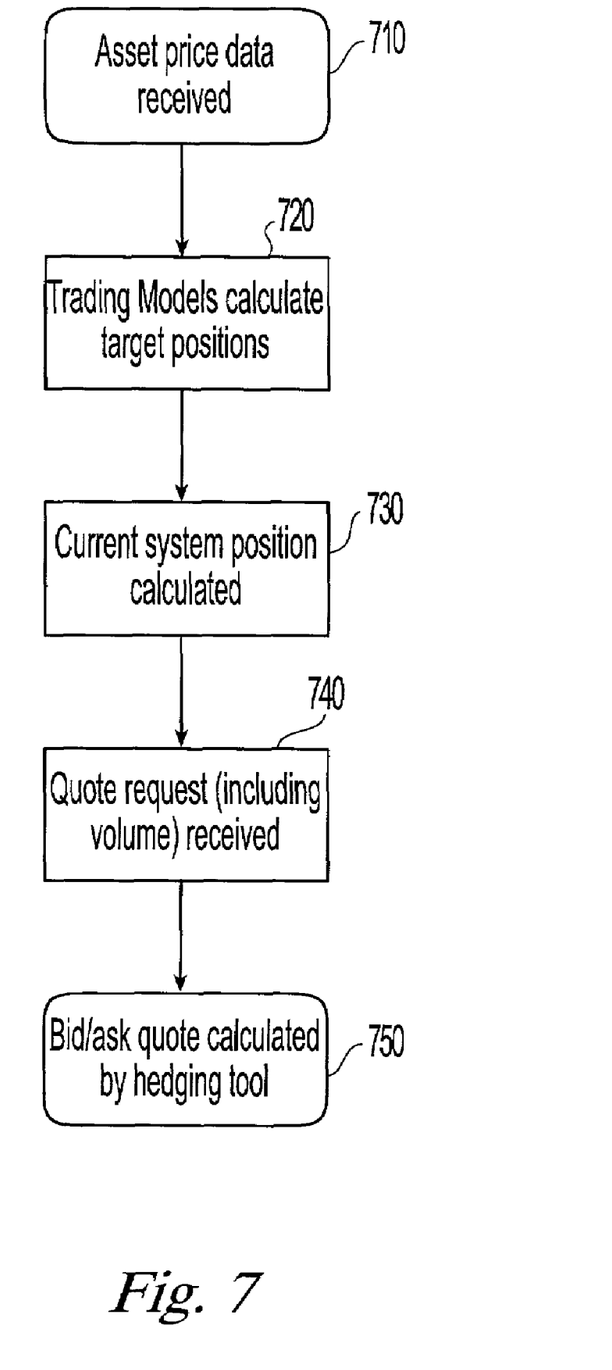
FIG. 7 illustrates steps of a preferred method of automated market making using a hedging tool.

FIG. 7 illustrates steps of a preferred method of market making using a hedging tool. At step 710, a preferred currency trading computer system receives foreign exchange rate data (asset price data). For ease and clarity of explication, this description of preferred embodiments is generally restricted to a foreign exchange/currency embodiment. Those skilled in the art will recognize that the subject invention is applicable to any asset amenable to market making, and FIG. 7, as well as the appended claims, applies to all such assets—not just to currencies. At step 720, one or more trading models (actually, computer software based on such trading models) calculates target positions based on the received price data. Each position is re-evaluated each time a new price datum arrives.

At step 730, the actual current position of the trading system is calculated. This can be done by any sort of portfolio management software, and is based on the positions of each of the system's clients. At step 740, a request for a quote is received from a client. This request comprises the volume of the order for which the quote is requested. It may or may not include the side of the order (buy or sell). At step 750, a preferred embodiment of the hedging tool described herein calculates a bid/ask quote (i.e., a bid quote and an ask quote) based on the current system position and the target positions calculated by the trading models, as well as on the size of the proposed order from the client.

2.2 Trading Models

A detailed description of a preferred trading model structure is given in Pictet, O. V., Dacorogna, M. M., Müller, U. A., Olsen, R. B., and Ward, J. R., *Real-time trading models for foreign exchange rates*, Neural Network World 2, 713-744 (1992) (hereinafter (Pictet 1992)). A second description is provided in Dacorogna, M.M.,Müller, U. A., Jost, C., Pictet, O. V., Olsen, R. B., and Ward, J. R., *Heterogeneous real-time trading strategies in the foreign exchange market*, European Journal of Finance 1, 383-403 (1995) (hereinafter Dacorogna 1995).

Figure 1:
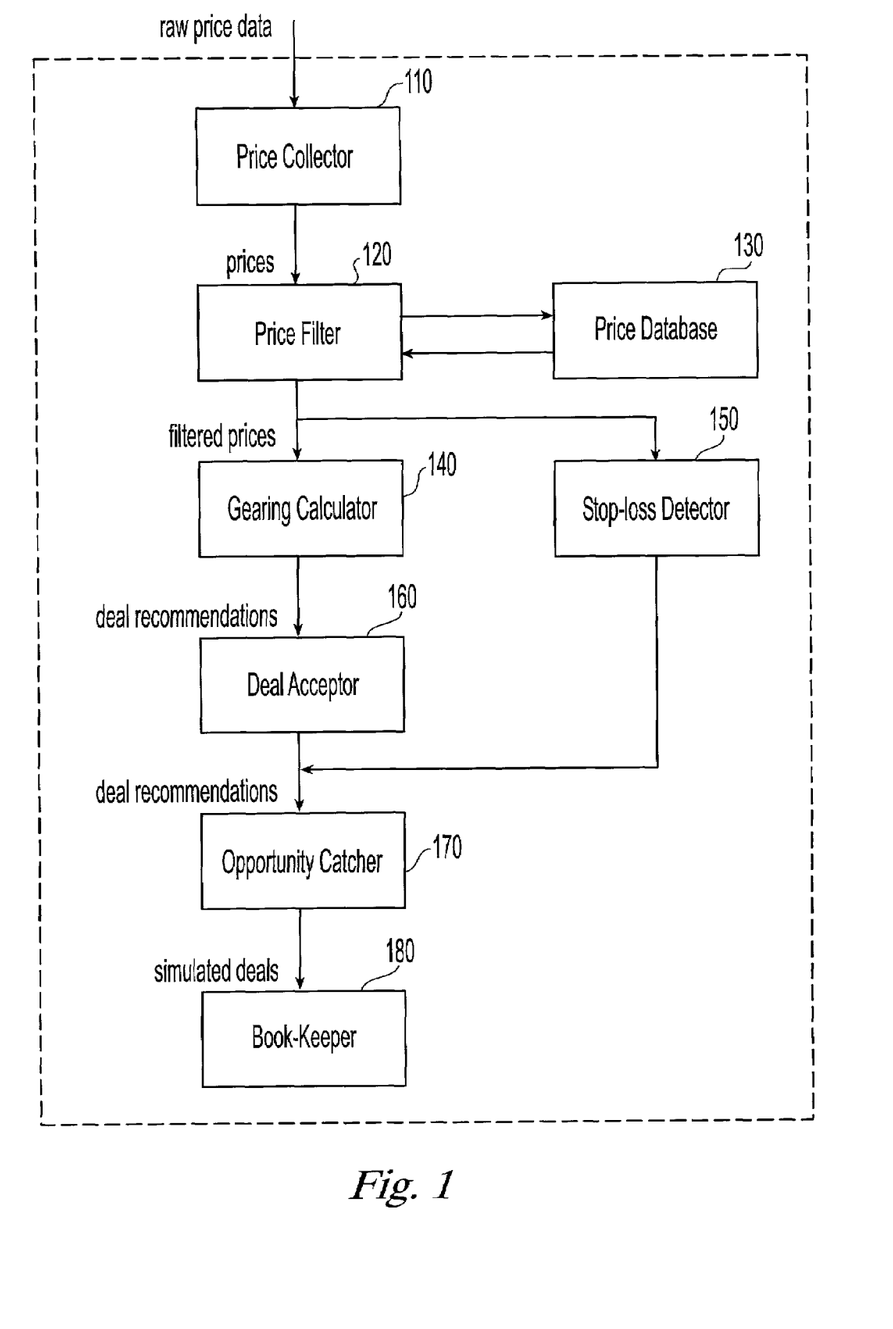
FIG. 1 depicts a data flow and structure diagram of preferred trading model software.

Individual models can differ in various aspects like time horizon and risk profile. For those skilled in the art to be able to implement the subject invention, detailed knowledge about the design and implementation of the referenced trading models is not necessary. For those interested, detailed explanations of exemplary preferred trading models are provided in (Pictet 1992) and (Dacorogna 1995), the contents of which are incorporated herein by reference for background information on trading models. Only a general description of preferred trading model software is given herein. FIG. 1 depicts a data flow and structure diagram of preferred trading model software.

At the most general level, a trading model consists of a set of indicator computations combined with a collection of rules. See (Pictet 1992) for a detailed description of typical indicators; indicator computations provide an analysis of past price movements. The indicators are mapped into actual trading positions by applying various rules. For instance, a model may enter a long position if an indicator exceeds a certain threshold. Other rules determine whether a deal may be made at all, and the timing of a recommendation. Thus, indicator computations are based on price history, and a collection of rules determines the applicability of the indicator computations to the generation of trading recommendations.

Referring to FIG. 1, in computer software that comprises preferred trading model software, a Price Collector 110 collects price quotes from data feeds received over a computer network. A Price Filter 120 receives the collected price quotes and filters them in real-time, storing filtered price quotes in a Price Database 130 and sending them to a Gearing Calculator 140. Although any appropriate method of real-time data filtering can be used to filter prices without departing from the present invention, a preferred method is disclosed in U.S. Provisional patent application No. 60/200,744, titled "Filtering of High Frequency Time Series Data," filed May 1, 2000, to Muller.

A Gearing Calculator 140 specifies the recommended gearing (exposure size), based on indicator computations that depend on the received and filtered price quote data, trading rules that depend on past dealing history, current position, and other quantities such as current unrealized return of an open position. Software of preferred models uses the following gearings: −1, −0.5, 0, +0.5, and +1, corresponding to short with all of the available capital, short with half of the available capital, neutral, long with half of the available capital, and long with all of the available capital, respectively. The position is re-evaluated each time a new price quote arrives.

A Deal Acceptor 160 validates the recommendations of the Gearing Calculator 140 under the following conditions: (1) no deal may take place within fifteen minutes of a deal already having occurred, and (2) a stringent deal filter determines whether a given price is suitable for dealing. A Stop-loss Detector 150 triggers if the market moves in the wrong direction and passes a stop-loss price, causing a deal-to-neutral position. The stop-loss price can be adjusted dynamically.

An Opportunity Catcher 170 searches for a realistic price at which to execute the deal, preferably in a time window of 2-3 minutes (depending on the currency). Then it executes a simulated deal and provides signals to a human dealer (see section 3.6 of (Pictet 1992) for more details). A Book-keeper 180 software module evaluates the trading model statistics.

A preferred hedging tool supports the following 10 FX rates consisting of the major currencies: EUR-USD, USD-JPY, EUR-JPY, USD-CHF, GBP-USD, EUR-GBP, EUR-CHF, GBP-JPY, GBP-CHF, CHF-JPY. Each currency pair has at least one trading model. Preferably, some currency pairs have a plurality of different trading models, such that the effective trading model position (and therefore the desired exposure of the CTS) for an individual currency pair is defined as a weighted average of the different trading models' positions. Some trading models are restricted to a local market; for example, one model might be used for Zurich, one for London, one for New York, etc. The determination of the precise weights of the single models is based on past performance, and is optimized after a study of the portfolio behavior. See section 4.

In an exemplary empirical study performed in Section 4 we consider an equally weighted portfolio, and each pair of currencies is treated with a separate model for the calculation of the bid and ask prices. For final real-time trading of all the FX rates together, a multivariate quoting scheme is implemented, such that cross-arbitrage opportunities against the CTS are reduced. The solution to this problem will be given through the definition of "effective quotes" that take into account all possible cross-trading possibilities. Obviously, the "effective bid" obtained through trading any possible combinations of cross rates must be smaller than the directly quoted ask, and vice versa, in order to avoid arbitrage possibilities. In Section 4, we only examine the univariate case of a single currency pair.

The basic underlying algorithm presented in the next section will remain applicable in a multivariate quoting scheme, as those skilled in the art will recognize.

3 Calculation of Bid and Ask Prices

In this section we present a method for calculation of bid/ask quotes provided for a single FX rate.

3.1 Definition of Exposures and Constraints

Given the currency pair XXX-YYY, a preferred hedging tool starts with the positions $g_i$ of the trading models (TMs) calculated at step 730, expressed by their weighted sum, denoted $g_{XY}$, $$g_{XY} = \sum_{i=1}^{\#TMs} w_i g_i. \tag{1}$$

We define an "equilibrium position" $\bar{g}_{XY}$ of the hedging tool:

$$\bar{g}_{XY} = \epsilon g_{XY} \tag{2}$$

where $\epsilon$ defines the desired amount of exposure of the hedging tool to the trading model. Its value should be between 0.5 and 1.0 in order to keep the exposure of the CTS in the same direction as the exposure due to the positions of the trading models. This ensures that the risk of the CTS remains comparable to the risk of the TM portfolio. The closer $\epsilon$ is to 1, the closer the overall risk profile of the CTS is to the risk profile of the TM portfolio. Inversely, the closer its value is to 0.5, the more the CTS is exposed to the uncertainties of the price inventory, i.e., the market making risk. This parameter $\epsilon$ is a crucial one for a preferred hedging model. Its optimal value is obtained through testing. See section 4.

The exposure of a preferred currency trading system due to the positions of N clients is:

$$V_{clients} = \sum_{i=1}^{N} -v_i(p_{bid}^M, p_{ask}^M) \tag{3}$$

with the variable $v_i$ denoting the i-th component of the net exposure vector $\vec{v}$ that is due to the i-th client. We use the following notation: $\vec{v} := \{v_i | i=1, \ldots, N\}$. The variables $p_{bid}^M$ and $p_{ask}^M$ denote the interbank bid/ask quotes.

A preferred CTS is constructed such that the exposure due to the trading model position is $$V_{TM} = \bar{g}_{XY} \cdot C = \epsilon \cdot g_{XY} \cdot C, \tag{4}$$

where C is an input variable that denotes the allocation employed by the CTS. The overall net exposure $V_{net}(V_{clients}, g_{XY})$ of the CTS is defined by $$V_{net} = \sum_i Pos_i, \tag{5}$$

where $Pos_i$ is the amount of home currency in the ith open position. Note that $Pos_i$ could be negative. (In the currency pair XXX-YYY, XXX is the home currency.) I.e., $V_{net}$ is the total amount of home currency appearing in all open positions corresponding to the FX rate of interest.

$V_{net}$ thus consists of two parts:
1. the exposure originating in the trading model position: $V_{TM}$, and
2. the remaining exposure from the positions of the clients: $V_{CTS} := V_{net} - V_{TM}$.

Note that $V_{net}$ is nominated in terms of the currency XXX: e.g., for USD-JPY, the exposure will be nominated in USD. Obviously, $V_{net}$ can also be negative. As long as the gearings of the trading models do not change, the exposure $V_{net}$ is purely a function of $V_{clients}$ and the market price.

The requirement that we impose on the overall net exposure is $$C_- \leq V_{net} \leq C_+ \tag{6}$$

where $C_- = \bar{g}_{XY} \cdot C - (1-\epsilon) \cdot C$ and $C_+ = \bar{g}_{XY} \cdot C + (1-\epsilon) \cdot C$ describe the boundaries of possible exposures of the CTS.

3.2 Determination of Price Quotes

At any time $t_n$ the current market prices $p_{bid}^M$ and $p_{ask}^M$ (if necessary defined by previous tick interpolation) are provided by a (preferably filtered) data feed. Furthermore, the position $g_{XY}$ of the trading model is given by a portfolio tracking tool. The overall net exposure is expressed by the function $V_{net}(t_n, \vec{v}, g_{XY})$, a function that is tracked by a system implementing the trading model. At each time $t_n$ a new datum (price quote from the database or new position of the trading model) arrives, the net exposure $V_{net}(t_n)$ has to be explicitly calculated.

Let us now consider a client trading request entering the system: A user asks for an amount $\Delta v$ of XXX to be exchanged in YYY ($\Delta v$ can be negative). We define the new potential net exposure $V_{netpot.}(t_n)$ after handling such a request by $$V_{netpot.}(t_n, \Delta V) = V_{net}(t_n) - \Delta v \tag{7}$$

Note that the function $V_{netpot.}$ is expressed in terms of the currency XXX. We define an "equilibrium exposure" $V_{equilibrium}$ to be equal to the exposure $V_{TM}$:

$$V_{equilibrium} = V_{TM}(g_{XY}) \tag{8}$$

An "out-of-equilibrium exposure" is defined to be $$V_{out}(t_n) = V_{net}(t_n) - V_{equilibrium}(t_n) = V_{CTS}. \tag{9}$$

and a "potential out-of-equilibrium exposure" $V'_{out}$ for an incoming request is then simply $$V'_{out}(t_n, \Delta v) = V_{netpot.}(t_n, \Delta v) - V_{equilibrium}(t_n) = V_{CTS}(\vec{v}) - \Delta v. \tag{10}$$

The definition of $V'_{out}(t_n, \Delta v)$ in eq. (10) enables us to define the bid/ask price to be quoted by the CTS:

$$p_{bid}(t_n, \Delta v) = \min(p_{ask}^M(t_n), (p_{eff}^M(t_n) - A_{spread} \cdot p_{spread}^M(t_n)) + f_{bid}(V'_{out}(\Delta v)))$$

$$p_{ask}(t_n, \Delta v) = \max(p_{bid}^M(t_n), (p_{eff}^M(t_n) + A_{spread} \cdot p_{spread}^M(t_n)) + f_{ask}(V'_{out}(\Delta v))) \text{ tm } (11)$$

where $p_{eff}^M$ and $p_{spread}^M$ denote average price and spread, respectively:

$$p_{eff}^M = \frac{p_{bid}^M + p_{ask}^M}{2}, \quad p_{spread}^M = \frac{p_{bid}^M - p_{ask}^M}{2}. \tag{12}$$

The parameter $A_{spread}$ will determine the spread of the quoted prices and constitutes an important testing parameter. The two quoting functions $f_{bid}$ and $f_{ask}$ determine the "quoting dynamics" of the CTS and are defined below.

In order to avoid direct arbitrage opportunities against the CTS, it has to be guaranteed that $$p_{bid \leq pask}{}^M \text{ and } p_{ask \geq pbid}{}^M. \tag{13}$$

Preferably, cross-rate trading arbitrages against the CTS are also excluded.

Note that the functions $f_{bid}$ and $f_{ask}$ are only functions of the requested transaction size $\Delta v$ (including its sign), as long as the exposure $V_{out}$ and the trading model gearings remain constant. This functional dependence is referred to herein as the "quote smile," by analogy to the volatility smile in option pricing. Note further that equation 11 cannot be expressed explicitly in terms of $p_{bid}(t_{n-1})$ and $p_{ask}(t_{n-1})$, since $f_{bid}$ and $f_{ask}$ are nonlinear.

3.3 Extensions of the Quoting Function

Those skilled in the art will recognize that refinements of the quoting algorithm expressed in eq. (11) include

- Making the spread size of the quotes volatility/activity dependent: This would preferably also include a proper definition of a business time scale.
- Short term forecast of prices
- Forecast of clients' position based on knowledge about their margins, trading frequency, etc.
- Making the functional form of eq. (11) dependent on the frequency of re-balancing the position through the interbank market: the more often the CTS can re-balance its exposure, the narrower the offered spreads can be.

3.4 Definition of Quoting Functions $f_{bid}$ and $f_{ask}$

For the exposure $V_{out}$ the following should hold:

$$C_- \leq V_{out} \leq C_+ \tag{14}$$

We will define the following transformation $$x := -1 + 2 \cdot \frac{V_{out} - C_-}{C_+ - C_-} \tag{15}$$

such that eq. (14) becomes simply: $-1 \leq x \leq 1$. In the following description, we express the functions $f_{bid}$ and $f_{ask}$ in terms of this transformed variable.

There are some "natural" properties that one expects the quoting functions $f_{bid}$ and $f_{ask}$ to fulfill. For no exposure (x=0), their value should be zero, while their value should adjust dynamically for non-zero exposure. In the case of large overall CTS exposure, the function should lead to a strong bias in quoting so as to favor balancing the position towards the equilibrium exposure $V_{eq}$. That is, we should have:

$f_{bid/ask}(V'_{out})=0$ for $V'_{out}=0$
$f_{bid}(V'_{out})>0$ for $V'_{out}<0$, $f_{ask}(V'_{out})>0$ for $V'_{out}<0$
$f_{bid}(V'_{out})<0$ for $V'_{out}>0$, $f_{ask}(V'_{out})<0$ for $V'_{out}>0$
Asymmetry in case of large exposure $f_{bid}(V'_{out}(t_n) \approx C_+)$
$<< f_{ask}(V'_{out}(t_n) \approx C_-)$ Those skilled in the art will recognize that there are several candidates with which to define such functions. Examples include:

odd polynomial functions: $f(x) \propto -x^{2n+1}$, $n \in N$,
tangent functions:

$$f(x) \propto -\tan\left(\frac{A\pi}{2}x\right),$$

stepwise linear functions:

$$f(x) = \begin{cases} A_- \cdot x + b_- & \text{if } x < x_- \\ A_0 \cdot x + b_0 & \text{if } x_- > x > x_+ \\ A_+ \cdot x + b_+ & \text{if } x > x_+ \end{cases},$$

and
inverse sigmoid functions:

$$f(x) \propto -\ln\left(\frac{A}{\frac{A}{2} - x} - 1\right), \tag{16}$$

where A controls the location of the singularities.

A preferred embodiment uses inverse sigmoid functions combined with a polynomial function in the hedging model. The parameter A is chosen according to the interval $[C_-, C_+]$ defined in (6) and transformed as in (15): e.g., A=2.

Figure 2:
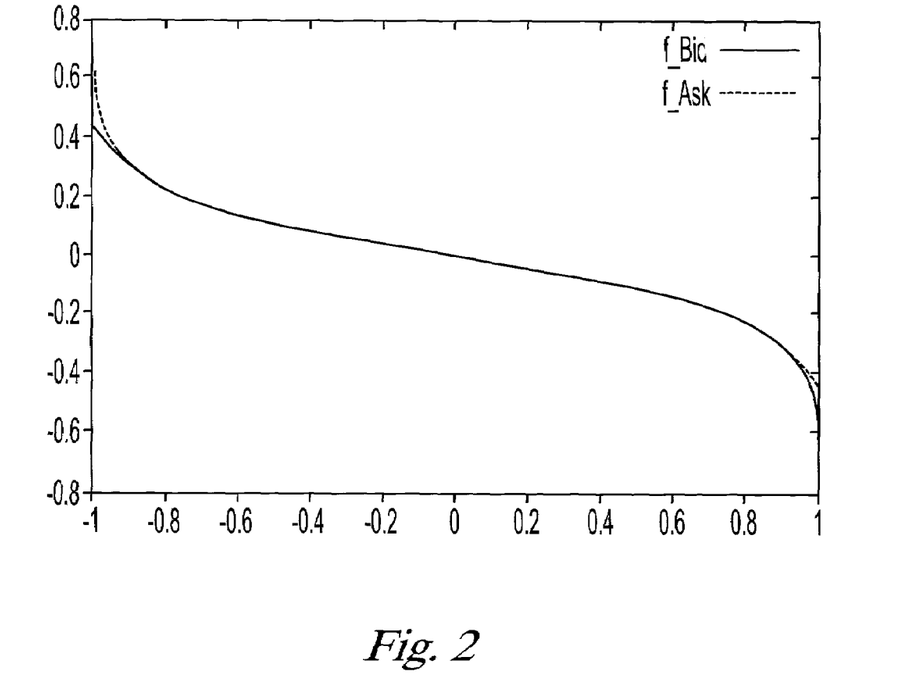
FIG. 2 depicts the graph of the function in equation 3.16, with A=2 and b=10.

In order to account for the aforementioned asymmetry for large exposure sizes, we define a special behavior of the functions $f_{bid}$ and $f_{ask}$ in this critical region. The functions $f_{bid}$ and $f_{ask}$ above therefore have the following final form:

$$f_{bid}(x) = A_f \cdot \begin{cases} \frac{-1}{b}\ln\left(\frac{2}{1-x} - 1\right) & \text{if } x > -E \\ -0.5 \cdot x^3 + \tilde{E} & \text{if } x \leq -E \end{cases} \tag{17}$$

with $\tilde{E} = \frac{-1}{b}\ln\left(\frac{2}{1+E} - 1\right) - 0.5E^3$ $$f_{ask}(x) = A_f \cdot \begin{cases} \frac{-1}{b}\ln\left(\frac{2}{1-x} - 1\right) & \text{if } x < E \\ -0.5 \cdot x^3 + \tilde{E} & \text{if } x \geq E \end{cases}$$

with $\tilde{E} = \frac{-1}{b}\ln\left(\frac{2}{1-E} - 1\right) + 0.5E^3$ where E denotes the asymmetry parameter and is chosen at a reasonable value of E=0.9. The functions $f_{bid}$ and $f_{ask}$ are displayed in FIG. 2, with A=2 and b=10. The parameter b determines how much bid and ask quoting functions deviate (i.e., how large the quoted spread is) in the border region of the (transformed) interval $[C_-, C_+]$. The two parameters b and $A_f$ in eq. (21) must be chosen reasonably. They are subject to optimization as in the exemplary study described herein in section 4.

3.5 Closing of Open Positions

At different moments the CTS has to close its open position/overexposure in the regular FX market, such as EBS or Reuters dealing, or a regular bank. The more often this rebalancing can be performed, the narrower the bid-ask spread offered can be. The hedging tool has to give a maximal accepted exposure size (and possibly time) at which a closing of the position has to be executed. At certain exposure limits $C_- \leq V_{out} \leq C_+$ the CTS will start setting limits with respect to the interbank markets. These limits are set according to the quoting function defined in definition (11) (or a variation of this function defined in a more refined embodiment of the hedging tool). In one embodiment we simply set a limit according to definition (11), once the transformed exposure x exceeds a certain threshold value T, and we choose T to be 0.92 in our empirical studies. In alternate embodiments a more sophisticated interaction between the clearing process in the interbank market and the quoting process of the CTS can be defined.

3.6 Summary of Hedging Method

Figure 8:
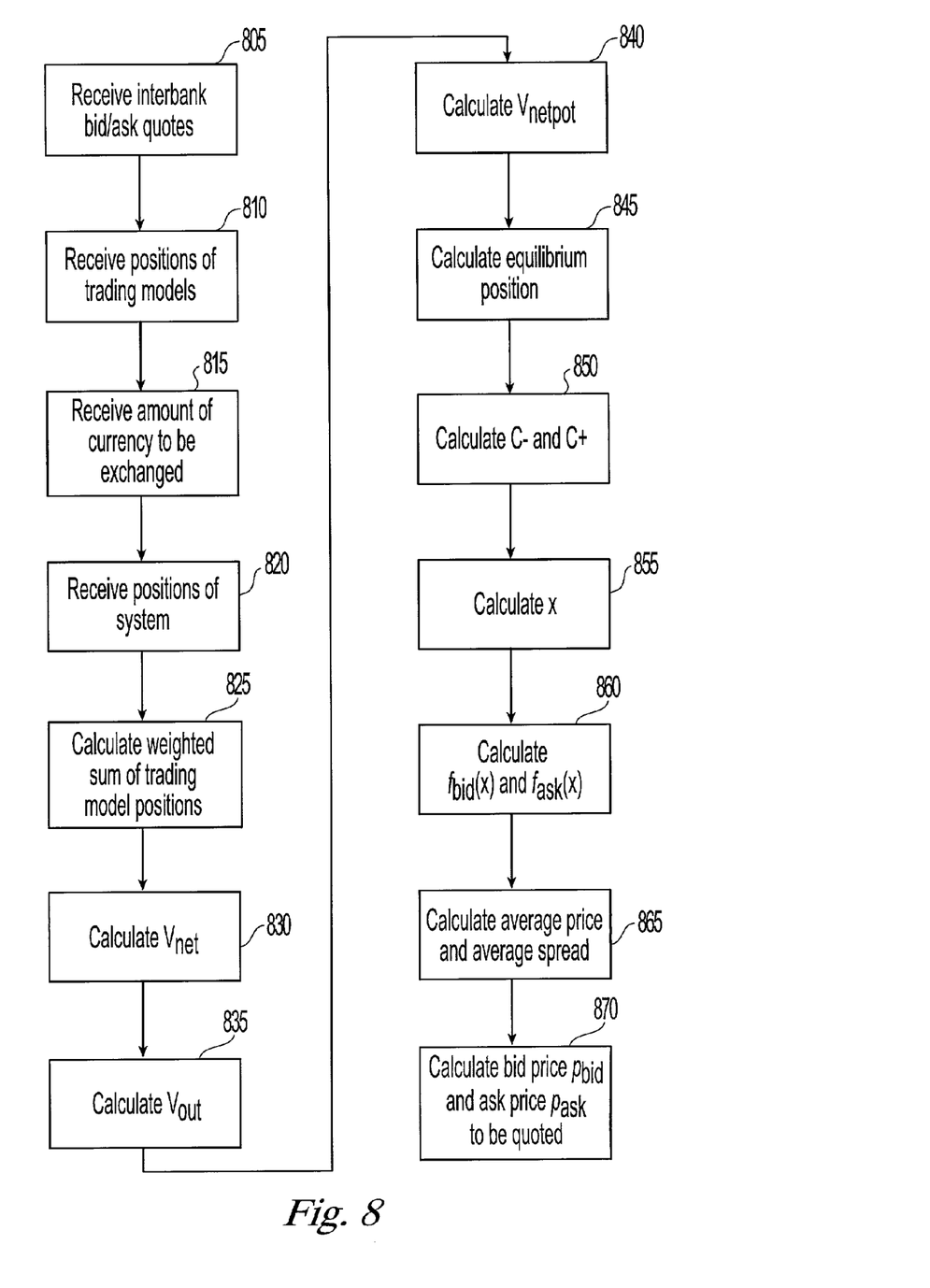
FIG. 8 illustrates the steps shown in FIG. 7 in greater detail.

FIG. 8 illustrates the steps shown in FIG. 7 in greater detail. The order in which the steps are listed is by way of example only. The preferred embodiment should be understood to encompass any sequence of steps that is feasible.

At step 805, a preferred system receives interbank bid/ask quotes $p_{bid}^M$ and $p_{ask}^M$. At step 810, the system receives data describing the positions $g_i$ of the trading models (TMs). At step 815, the system receives data describing an amount $\Delta v$ of currency XXX to be exchanged in currency YYY. At step 820, the system receives data describing open positions of the system. Once the above data is received, calculations are performed. However, some calculations can be performed before all of the above data is received—again, any feasible ordering of the described steps is encompassed by the subject invention. Each calculation is performed by a computer processor, and the result of each calculation is stored in a computer-readable medium.

At step 825, the weighted sum of the trading model positions, denoted $g_{XY}$, $$g_{XY} = \sum_{i=1}^{\#TMs} w_i g_i. \tag{18}$$

is calculated, along with the exposure $V_{TM}$ of the trading model positions. At step 830, $V_{net}$ is calculated. At step 835, $V_{out}$ is calculated, and at step 840, $V_{netpot.}$ is calculated. At step 845, an equilibrium position $\bar{g}_{XY}$ is calculated:

$$\bar{g}_{XY} = \epsilon \cdot g_{XY} \tag{19}$$

where $\epsilon$ defines the desired amount of exposure of the hedging tool to the trading model.

At step 850, $C_- = \bar{g}_{XY} \cdot C - (1-\epsilon) \cdot C$ and $C_+ = \bar{g}_{XY} \cdot C + (1-\epsilon) \cdot C$ are calculated. At step 855, the transformation $$x := -1 + 2 \cdot \frac{V_{out} - C_-}{C_+ - C_-} \tag{20}$$

is calculated.

At step 860, the values $$f_{bid}(x) = A_f \cdot \begin{cases} \frac{-1}{b}\ln\left(\frac{2}{1-x} - 1\right) & \text{if } x > -E \\ -0.5 \cdot x^3 + \tilde{E} & \text{if } x \leq -E \end{cases} \tag{21}$$

with $\tilde{E} = \frac{-1}{b}\ln\left(\frac{2}{1+E} - 1\right) - 0.5E^3$ $$f_{ask}(x) = A_f \cdot \begin{cases} \frac{-1}{b}\ln\left(\frac{2}{1-x} - 1\right) & \text{if } x < E \\ -0.5 \cdot x^3 + \tilde{E} & \text{if } x \geq E \end{cases}$$

with $\tilde{E} = \frac{-1}{b}\ln\left(\frac{2}{1-E} - 1\right) + 0.5E^3$, where E denotes the asymmetry parameter and is chosen at a reasonable value of E=0.9, are calculated. At step 865, the average price and average spread $$p_{eff}^M = \frac{p_{bid}^M + p_{ask}^M}{2}, \quad p_{spread}^M = \frac{p_{bid}^M - p_{ask}^M}{2} \tag{22}$$

are calculated. Finally, at step 870, the bid and ask prices quoted by the system are calculated:

$$p_{bid}(t_n, \Delta v) = \min(p_{ask}^M(t_n), (p_{eff}^M(t_n) - A_{spread} \cdot p_{spread}^M(t_n)) + f_{bid}(V'_{out}(\Delta v)))$$

$$p_{ask}(t_n, \Delta v) = \max(p_{bid}^M(t_n), (p_{eff}^M(t_n) - A_{spread} \cdot p_{spread}^M(t_n)) + f_{ask}(V'_{out}(\Delta v))) \tag{23}$$

4 Empirical Study

An exemplary empirical study of the hedging tool illustrates a preferred method for optimizing performance of the hedging tool. It is based on the following:

The (filtered) price data defines the realistic market price level for the interbank market, $p_{bid}^M$ and $p_{ask}^M$.

The requests of the CTS's clients are simulated with EBS data (transaction prices) (EBS is an electronic broking service for interbank foreign exchange; see http://www.ebsp.com). An incoming EBS transaction price is interpreted as a client request. Thereby the volume of the request and its sign (whether it is a buy or a sell request) is determined by the difference from the price $$p_{eff} = \frac{p_{bid} + p_{ask}}{2};$$

so that $$\text{Volume} = a_{Volume} \cdot (p_{EBS} - p_{eff}^M) \tag{24}$$

Here, the parameter $a_{Volume}$ is chosen to be a fixed multiple of the allocation size $$C : \frac{a_{Volume}}{C} = 0.25.$$

A bid/ask quote for the CTS is calculated based on the transaction volume according to formula (11).

Overexposure leads to a closing of the exposure through the interbank market with realistic market prices.

The following statistical properties are calculated:
total return
number of matched/executed trades versus the total number of requests
the number of trades executed in the market
average spread In the following table the relevant parameters of this analysis are listed and explained:

| Parameters | Meaning | Treatment |
|---|---|---|
| b | shape of function $f_{bid/ask}$ in the high exposure regime | preliminarily optimized to b = 2.0 |
| $A_f$ | scale of the function $f_{bid/ask}$ | preliminarily optimized to to $A_f$ = 0.004 |
| $\epsilon$ | desired amount of to the TM position | systematically examined |

-continued

| Parameters | Meaning | Treatment |
|---|---|---|
| $A_{spread}$ | controlling the spread of the quotes | systematically examined |

Preferred software for implementation of a preferred embodiment follows C++ design. A central ingredient of this design is a class "HtmPriceQuote" that consists of all the functionality for the price quote generation. In particular, the functions $f_{bid}$ and $f_{ask}$ are implemented within this class. "HtmPriceQuote" contains a class "HtmExposure" that calculates and updates the exposure as well as the potential exposure for an incoming request. Furthermore "HtmPriceQuote" also contains the class "HtmBookKeeper" that performs the bookkeeping tasks. A class "HtmExecute" serves as the wrapper for "HtmPriceQuote."

The exemplary analysis was performed based on the period from Jun. 10, 1998, to Nov. 20, 1998, and on the currency rate USD-DEM. We used three trading models, with equal weights.

4.1 Results

Figure 3:
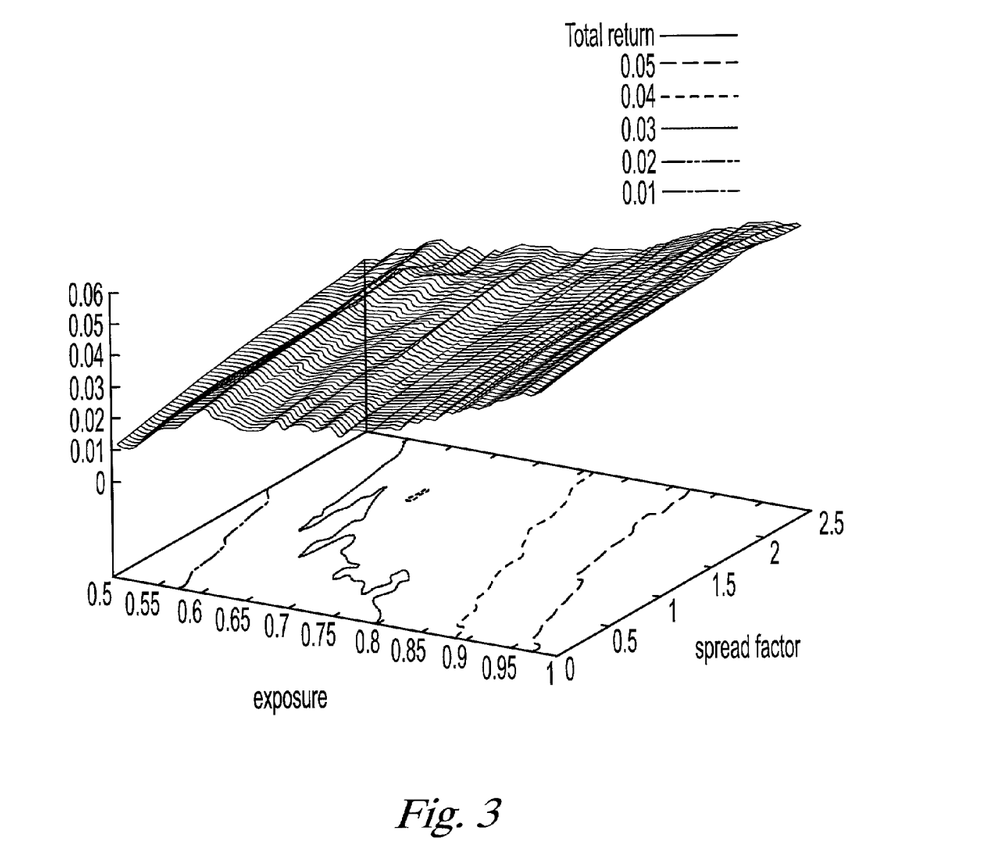
FIG. 3 depicts return versus trading model exposure $\epsilon$ and spread term $a_{spread}$.
Figure 4:
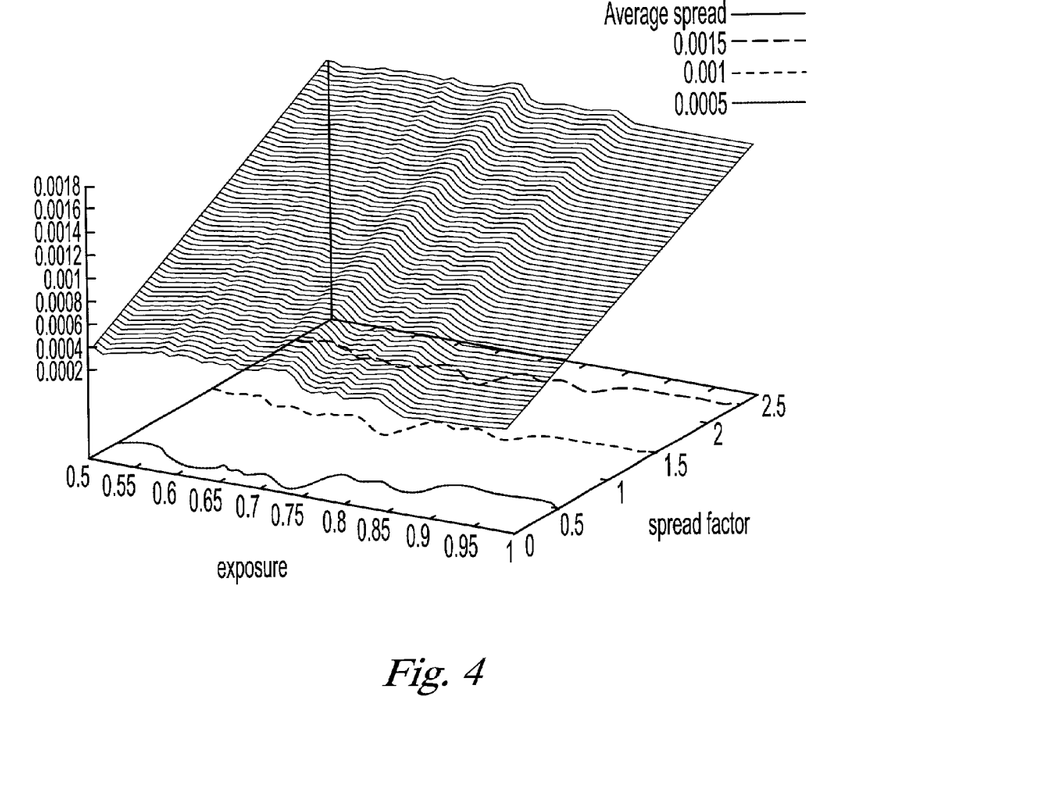
FIG. 4 depicts average spread versus trading model exposure $\epsilon$ and spread term $a_{spread}$.
Figure 5:
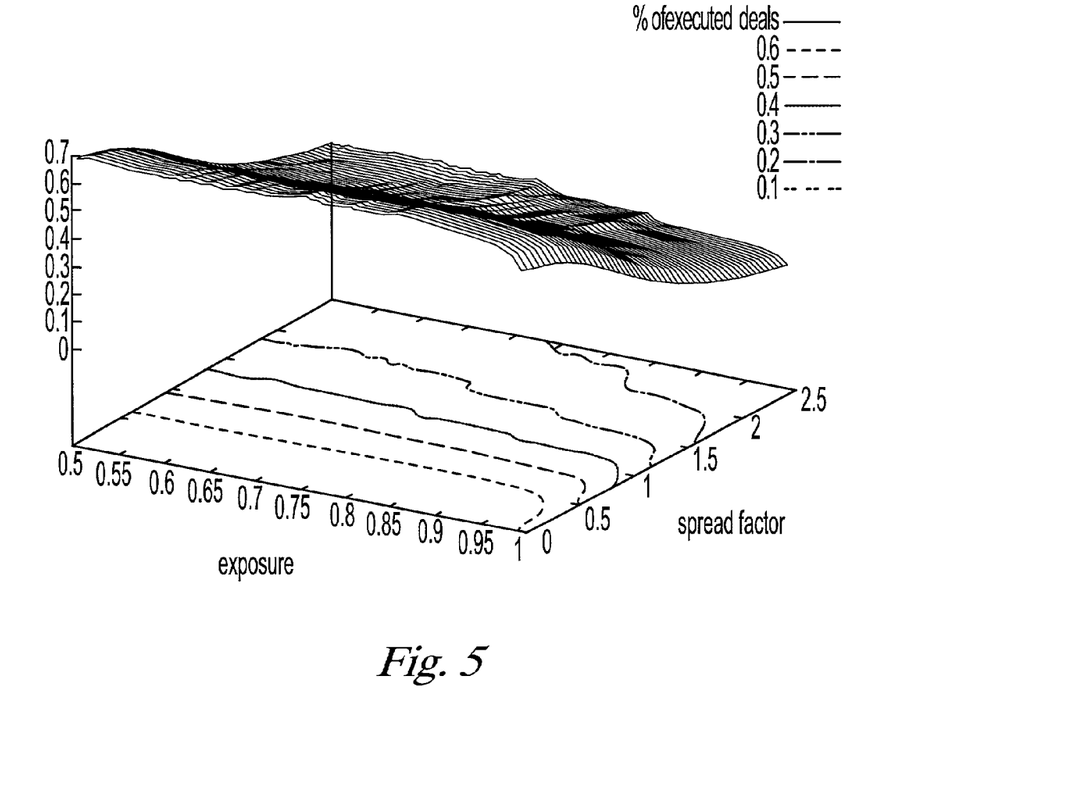
FIG. 5 depicts number of deals done after a request in relation to the whole number of requests versus trading model exposure $\epsilon$ and spread term $\alpha_{spread}$.
Figure 6:
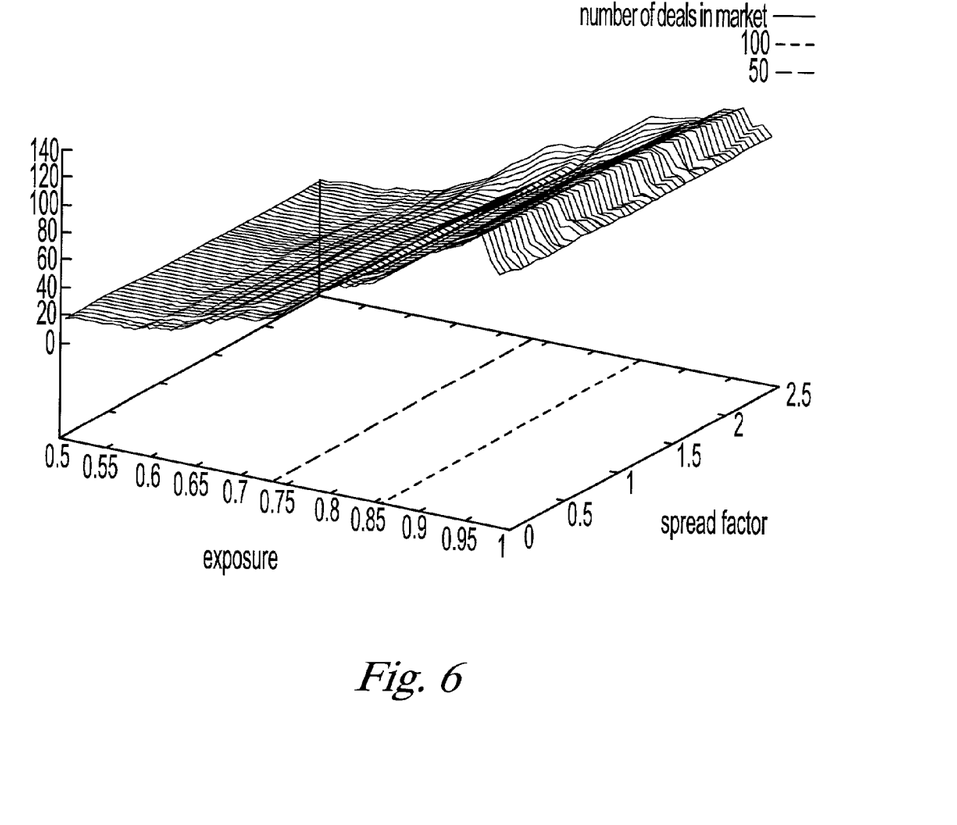
FIG. 6 depicts number of trades executed in the interbank market versus trading model exposure $\epsilon$ and spread term $\alpha_{spread}$.

We varied the parameters $\epsilon$ and the spread term $a_{spread}$ systematically while choosing the other parameter as specified. FIG. 3 shows the total return of the model depending on the choice of the trading model exposure $\epsilon$ and spread term $a_{spread}$. FIG. 4 shows the average spread quoted by the quoting engine versus trading model exposure $\epsilon$ and spread term $a_{spread}$, while FIG. 5 shows the number of deals done after a request in relation to the whole number of requests versus trading model exposure $\epsilon$ and spread term $a_{spread}$. Finally FIG. 6 shows how many trades were executed in the interbank market, versus trading model exposure $\epsilon$ and spread term $a_{spread}$.

The following table displays the relevant statistical information for an optimal choice of the two parameters $\epsilon$ and $a_{spread}$:

| Statistics | Value |
|---|---|
| Total Return | 0.0556 |
| Average spread | — |
| Number of market trades | 94 |

While the subject invention has been particularly shown and described with reference to preferred embodiments of the system and methods thereof, it will also be understood by those of ordinary skill in the art that various changes, variations, and modifications in form, details, and implementation may be made therein without departing from the spirit and scope of the invention as defined by the appended claims. For example, although the description of preferred embodiments has focused on a currency trading system, it will be apparent to those skilled in the art that the subject invention is also applicable to securities markets, options markets, and any other markets that are facilitated by market makers.

What is claimed is:

1. A method performed by a computer of market making in an asset trading system, comprising the steps of:
    (a) receiving asset price data for a first asset;
    (b) receiving current system position information for the first asset;
    (c) receiving quote request information for the first asset;
    (d) calculating target position information for the first asset for each of one or more trading models; and
    (e) calculating with the computer a bid/ask quote in response to said received quote request information, said calculation of a bid/ask quote using a hedging method and being based on said asset price data, said quote request information, said current system position information, and said target position information.

2. A method as in claim 1, wherein each of said one or more trading models comprises:
    (a) a price collector component;
    (b) a price filter component;
    (c) a price database component;
    (d) a gearing calculator component;
    (e) a deal acceptor component;
    (f) an opportunity catcher component; and
    (g) a book-keeper component.

3. A method as in claim 1, wherein said calculation of a bid/ask quote is also based on a weighted sum of target position information of said trading models.

4. A method as in claim 1, wherein said first asset is a currency, and wherein said hedging method comprises the step of calculating a weighted sum of said trading model positions.

5. A method as in claim 1, wherein said first asset is a currency, and wherein said hedging method comprises the step of calculating a total exposure from said trading model positions.

6. A method as in claim 1, wherein said first asset is a currency, and wherein said hedging method comprises the step of calculating a total amount of home currency appearing in all open positions.

7. A method as in claim 1, wherein said first asset is a currency, and wherein said hedging method comprises the step of calculating an out-of-equilibrium exposure.

8. A method as in claim 1, wherein said first asset is a currency, and wherein said hedging method comprises the step of calculating a new potential net exposure.

9. A method as in claim 1, wherein said first asset is a currency, and wherein said hedging method comprises the step of calculating an equilibrium position.

10. A method as in claim 1, wherein said first asset is a currency, and wherein said hedging method comprises the step of calculating boundaries of possible exposures.

11. A method as in claim 1, wherein said first asset is a currency, and wherein said hedging method comprises the step of calculating values for a pair of quoting functions.

12. A method as in claim 11, wherein said quoting functions are odd polynomial functions.

13. A method as in claim 11, wherein said quoting functions are tangent functions.

14. A method as in claim 11, wherein said quoting functions are stepwise linear functions.

15. A method as in claim 11, wherein said quoting functions are inverse sigmoid functions.

16. A method as in claim 11, wherein said quoting functions are combinations of odd polynomial functions, tangent functions, stepwise linear functions, and inverse sigmoid functions, and wherein said combinations may comprise less than all four types of functions.

17. A method as in claim 1, wherein said first asset is a currency, and wherein said hedging method comprises the step of calculating an average price and an average spread.

18. A method as in claim 1, wherein said first asset is a currency, and wherein said hedging method comprises the steps of:

(a) calculating a weighted sum of said trading model positions;
(b) calculating a total exposure from said trading model positions;
(c) calculating a total amount of home currency appearing in all open positions;
(d) calculating an out-of-equilibrium exposure;
(e) calculating a new potential net exposure;
(f) calculating an equilibrium position;
(g) calculating boundaries of possible exposures;
(h) calculating values for a pair of quoting functions; and
(i) calculating an average price and an average spread.

19. A computer-readable medium, having computer code executable by a computer for:
(a) receiving asset price data for a first asset;
(b) receiving current system position information for the first asset;
(c) receiving quote request information for the first asset;
(d) calculating target position information for the first asset for each of one or more trading models; and
(e) calculating a bid/ask quote in response to said received quote request information, said calculation of a bid/ask quote using a hedging method and being based on said asset price data, said quote request information, said current system position information, and said target position information.

20. The computer-readable medium as in claim 19, wherein each of said one or more trading models comprises:
(a) a price collector component;
(b) a price filter component;
(c) a price database component;
(d) a gearing calculator component;
(e) a deal acceptor component;
(f) an opportunity catcher component; and
(g) a book-keeper component.

21. The computer-readable medium as in claim 19, wherein said calculation of a bid/ask quote is also based on a weighted sum of the target position information of said trading models.

22. The computer-readable medium as in claim 19, wherein said asset is a currency, and wherein said first hedging method comprises the step of calculating a weighted sum of said trading model positions.

23. The computer-readable medium as in claim 19, wherein said asset is a currency, and wherein said first hedging method comprises the step of calculating a total exposure from said trading model positions.

24. The computer-readable medium as in claim 19, wherein said asset is a currency, and wherein said first hedging method comprises the step of calculating a total amount of home currency appearing in all open positions.

25. The computer-readable medium as in claim 19, wherein said asset is a currency, and wherein said first hedging method comprises the step of calculating an out-of-equilibrium exposure.

26. The computer-readable medium as in claim 19, wherein said asset is a currency, and wherein said first hedging method comprises the step of calculating a new potential net exposure.

27. The computer-readable medium as in claim 19, wherein said asset is a currency, and wherein said first hedging method comprises the step of calculating an equilibrium position.

28. The computer-readable medium as in claim 19, wherein said asset is a currency, and wherein said first hedging method comprises the step of calculating boundaries of possible exposures.

29. The computer-readable medium as in claim 19, wherein said asset is a currency, and wherein said first hedging method comprises the step of calculating values for a pair of quoting functions.

30. The computer-readable medium as in claim 29, wherein said quoting functions are odd polynomial functions.

31. The computer-readable medium as in claim 29, wherein said quoting functions are tangent functions.

32. The computer-readable medium as in claim 29, wherein said quoting functions are stepwise linear functions.

33. The computer-readable medium as in claim 29, wherein said quoting functions are inverse sigmoid functions.

34. The computer-readable medium as in claim 29, wherein said quoting functions are combinations of odd polynomial functions, tangent functions, stepwise linear functions, and inverse sigmoid functions, and wherein said combinations may comprise less than all four types of functions.

35. The computer-readable medium as in claim 19, wherein said asset is a currency, and wherein said first hedging method comprises the step of calculating an average price and an average spread.

36. The computer-readable medium as in claim 19, wherein said first asset is a currency, and wherein said hedging method comprises the steps of:
(a) calculating a weighted sum of said trading model positions;
(b) calculating a total exposure from said trading model positions;
(c) calculating a total amount of home currency appearing in all open positions;
(d) calculating an out-of-equilibrium exposure;
(e) calculating a new potential net exposure;
(f) calculating an equilibrium position;
(g) calculating boundaries of possible exposures;
(h) calculating values for a pair of quoting functions; and
(i) calculating an average price and an average spread.

* * * * *